United States Patent
Subramanian et al.

(10) Patent No.: US 7,051,435 B1
(45) Date of Patent: May 30, 2006

(54) PROCESS FOR REPAIRING TURBINE COMPONENTS

(75) Inventors: Pazhayannur Ramanathan Subramanian, Niskayuna, NY (US); James Anthony Ruud, Delmar, NY (US); Laurent Cretegny, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 107 days.

(21) Appl. No.: 10/459,805

(22) Filed: Jun. 13, 2003

(51) Int. Cl.
*B23P 6/00* (2006.01)

(52) U.S. Cl. ............. 29/889.1; 29/889.7; 29/402.11; 29/402.13

(58) Field of Classification Search ........... 29/889.1, 29/889.7, 889.2, 402.03, 402.04, 402.05, 29/402.06, 402.07, 402.09, 402.11, 402.13, 29/402.16; 228/119
See application file for complete search history.

(56) References Cited

U.S. PATENT DOCUMENTS

| 3,851,138 | A | * | 11/1974 | Metcalfe et al. ............. 219/83 |
| 4,008,844 | A | * | 2/1977 | Duvall et al. ............... 228/119 |
| 4,291,448 | A | | 9/1981 | Cretella et al. |
| 4,614,296 | A | * | 9/1986 | Lesgourgues ............... 228/194 |
| 4,743,733 | A | * | 5/1988 | Mehta et al. ............ 219/121.66 |
| 4,832,252 | A | * | 5/1989 | Fraser ..................... 416/241 R |
| 4,842,663 | A | * | 6/1989 | Kramer ....................... 156/98 |
| 4,866,828 | A | | 9/1989 | Fraser |
| 4,910,098 | A | * | 3/1990 | Lee et al. ................... 428/680 |
| 5,156,321 | A | | 10/1992 | Liburdi et al. |
| 5,351,395 | A | * | 10/1994 | Crawmer et al. .......... 29/889.7 |
| 5,523,169 | A | * | 6/1996 | Rafferty et al. ............. 428/551 |
| 6,036,083 | A | * | 3/2000 | Luo et al. ................... 228/223 |
| 6,049,978 | A | * | 4/2000 | Arnold ..................... 29/889.1 |
| 6,154,959 | A | | 12/2000 | Goodwater et al. |
| 6,173,491 | B1 | | 1/2001 | Goodwater et al. |
| 6,238,187 | B1 | * | 5/2001 | Dulaney et al. ........ 416/241 R |
| 6,451,454 | B1 | * | 9/2002 | Hasz et al. ................. 428/668 |
| 6,453,557 | B1 | | 9/2002 | Burdgick |
| 6,520,401 | B1 | * | 2/2003 | Miglietti ..................... 228/194 |
| 6,612,480 | B1 | * | 9/2003 | Rafferty ..................... 228/119 |
| 2002/0076571 | A1 | | 6/2002 | Johnson et al. |
| 2002/0119338 | A1 | * | 8/2002 | Hasz et al. ................. 428/558 |
| 2002/0197152 | A1 | * | 12/2002 | Jackson et al. ............. 415/115 |
| 2003/0021892 | A1 | | 1/2003 | Conner et al. |
| 2003/0082048 | A1 | * | 5/2003 | Jackson et al. ............. 415/115 |

* cited by examiner

*Primary Examiner*—Marc Jimenez
(74) *Attorney, Agent, or Firm*—Ann M. Agosti; Patrick K. Patnode

(57) ABSTRACT

A process for repairing a turbine component comprises overlaying a preform of a brazing material onto a surface of the turbine component, wherein the surface comprises a damaged portion; securing the preform of a brazing material to the surface; and heating the turbine component to a temperature effective to form a brazed joint between the brazing material and the turbine component. Also disclosed is a repaired turbine component repaired by the process.

16 Claims, 4 Drawing Sheets

After Brazing

After Grinding and 500 Cycles At 1,800°F

FSX414 Witness Coupon After 500 Cycles At 1,800°F

Cross-section of FSX414 Nozzle TE after Braze Repair

PROCESS FOR REPAIRING TURBINE COMPONENTS

BACKGROUND

This disclosure relates to a process for repairing damaged portions of a metal component and to a repaired metal component. More particularly, it relates to a process for repairing turbine components and to repaired turbine components.

Certain components of a power generating apparatus, for example a turbine engine, operate in a hot gas path of the apparatus. In the turbine section of a gas turbine engine, components are often subjected to significant temperature extremes and contaminants present in combustion gases resulting in cyclic loading from thermal expansion as well as wear from the hot gas flow. As a result of operating in such an environment, exposed portions of the turbine components are subject to degradation. Various forms of degradation may include, but are not limited to, oxidation effects, crack formation, and/or erosion and wear, such as on the airfoil and sidewall surfaces of the turbine component. These types of degradation can lead to a loss in turbine operating efficiency and possible damage to components located downstream from the degraded portion as a result of separation and contact therewith.

Within the aerospace and power generation industry, it has become much more economical to repair costly engine components than to replace them. The repair and restoration of the damaged portion prevents catastrophic failure, improves efficiency of the overall gas turbine, and reduces operating costs. To provide sufficient repair and restoration, the process should be able to restore the surface to its original dimensions while providing a structurally sound structure. Moreover, the duration of the repair should be minimal. To effect repair and restoration, the entire damaged portion is typically removed, e.g., by milling, cutting, machining, gouging, laser ablation, or the like, so that a compatible filler material can be deposited or coated. The filler material is then deposited to replace the removed portion. Adequate adhesion between the filler material and the parent or base metal is an important consideration for the repair. Ideally, the filler material should provide similar physical and mechanical properties as the parent metal. In addition, because of the harsh operating conditions to which the filled material and turbine component will be exposed, it is desirable that the filler materials exhibit sufficient corrosion and environmental resistance. It is also desirable that the processes for repairing the turbine component not damage the areas surrounding and extending beyond the repaired portion.

Current repair processes typically include a weld repair of the individual cracks, if visible, or replacement of the damaged portion by welding a coupon of new material into the recess formed by the removed damaged portion. Generally, welding repairs cracks or joins the coupon of new material to the parent component by melting and fusing them together. In order to fuse the metals, a concentrated heat source is applied directly to the joint area. This heat source is high temperature in order to melt the parent metal and the filler metals (the metals being joined). Because welding heat is intense, it is impractical to apply it uniformly over a broad area.

Unfortunately, because of the non-uniform concentrated heating and high temperatures employed, welding processes can cause a significant distortion to the turbine component to be repaired due to the severe thermal gradients across the turbine component caused by the non-uniform concentrated heating; can deleteriously lock in internal stress; can result in the formation of secondary cracks; can present difficulties repairing damaged portions proximate to cooling holes in the turbine component (e.g., such as nozzles) without affecting the holes themselves; and can require a significant amount of time and manual labor to effect the repair.

In addition to these problems that can be caused by welding, a preheating step may be required under certain circumstances as part of good welding practice. The purpose of the preheating step is to prevent hydrogen-induced cracking; this type of cracking occurs after the weld has cooled and usually runs from the toe of the weld or from other weld defects. Such a crack is difficult to detect and can be detrimental to the service life of the turbine component, particularly if the welds are located in highly stressed areas. The increased temperature from preheating increases the diffusion of hydrogen and bakes the hydrogen out of the weld. Preheating also allows a slower cooling rate of the weld preventing excessive loss of ductility in the weld and the heat-affected zone of the base metal. Of course, preheating also adds significant expense and repair times for the turbine component.

Also, in those cases where the welding process introduces distortion, the turbine component may need to be subjected to mechanical forces and/or a heat treatment to eliminate the stress caused by the distortion. Turbine components are of exacting specifications and it is important that the original shape and original specifications be maintained after the repair and restoration is complete.

Accordingly, there remains a need for improved repair and restoration processes for damaged turbine components.

BRIEF SUMMARY

Disclosed herein is a process for repairing a turbine component, comprising overlaying a preform of a brazing material onto a surface of the turbine component, wherein the surface comprises a damaged portion; securing the preform of a brazing material to the surface; and heating the turbine component to a temperature effective to form a brazed joint between the brazing material and the turbine component.

In another embodiment, a process for repairing a turbine component comprises removing a damaged portion from a surface of the turbine component to form a recessed portion in the surface; securing at least one preform of a brazing material to the recessed portion, wherein the preform has lateral dimensions about equal to lateral dimensions of the recessed portion; and heating the turbine component to a temperature sufficient to form a brazed joint between the brazing material and the turbine component.

The above described and other features are exemplified by the following detailed description and figures.

DETAILED DESCRIPTION

The present disclosure relates to a brazing process for repairing damaged portions of a turbine component. The process generally comprises overlaying a preform of a brazing material onto a surface of the turbine component, wherein the surface contains a damaged portion; spot welding a preform of a brazing material to the surface; and heating the turbine component to a temperature effective to form a brazed joint between the brazing material and the turbine component. The repair process preferably further includes machining the spot welded brazing material to return the turbine component to its original dimensions.

In accordance with another embodiment, the brazing process includes removing the damaged portion from the turbine component to form a recessed portion in the surface; inserting at least one preform of a brazing material into the recessed portion, wherein the at least one perform has lateral dimensions equal to the recessed portion lateral dimensions; spot welding the at least one preform to the recessed portion; and heating the turbine component to a temperature sufficient to form a brazed joint between the brazing material and the turbine component. Additional preforms may be added simultaneously processed or individually produced, to provide a sufficient thickness to fill the recessed portion completely. Preferably, a slight overfill of preforms is disposed in the recessed portion, which is then machined to restore the turbine component to its original dimensions.

Figure 1:
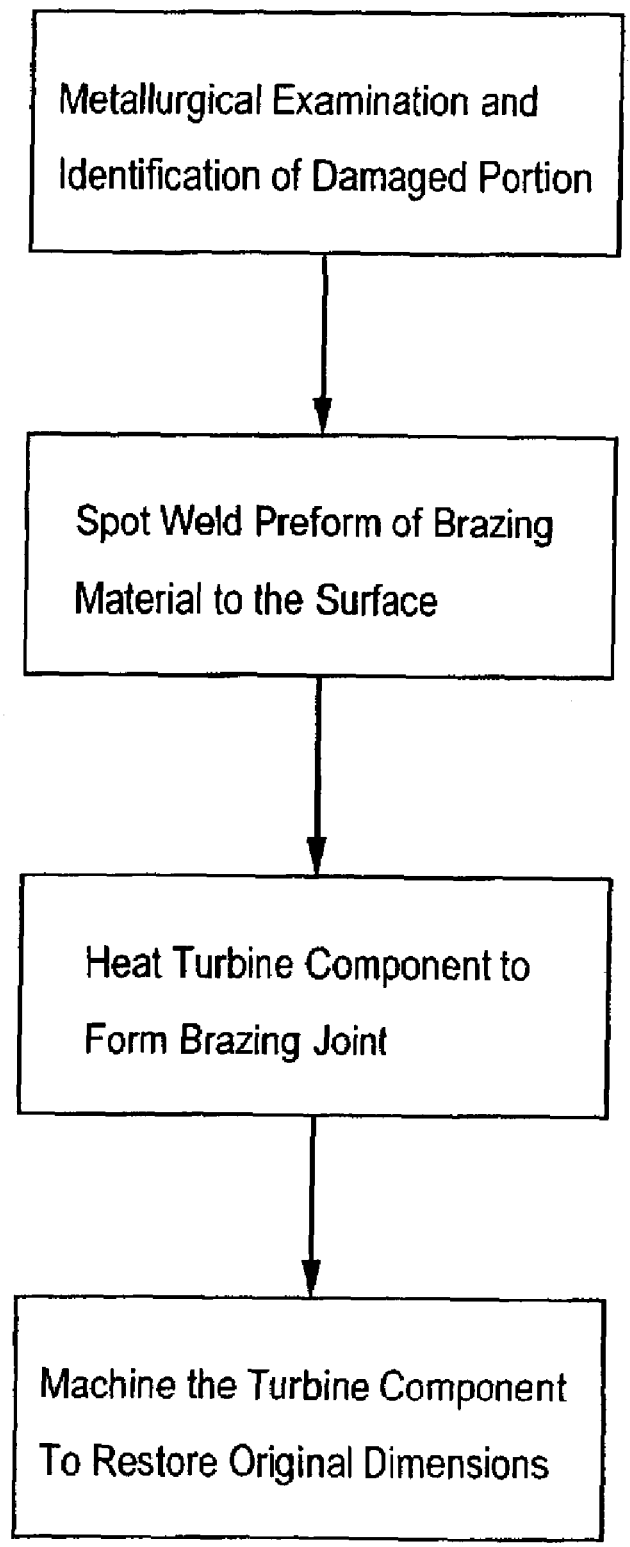
FIG. 1 is a process flow chart for repairing a turbine component.

Referring now to FIG. 1, an exemplary process flow is illustrated. The process flow includes a metallurgical analysis of the turbine component to identify damaged portions. Once the damaged portions are identified, preforms of a compatible brazing material are sectioned so as to have a sufficient area to completely cover the damaged portion. Turbine components can be made from a variety of materials depending on the function and operating conditions of the turbine. A typical material from which a gas turbine may be manufactured is a nickel based superalloy. The brazing material is selected to be compatible with the metal forming the turbine component.

Preforms are measured amounts of brazing alloys ensuring the exact volume required is used every time. Since the correct amount of alloy fills the damaged area, this usually results in a reduction of rejected parts. The preforms are preferably manufactured by sintering braze powders into the desired shape that best meets the needs of each application. The process is not intended to be limited to preforms of specific alloys. Suitable preforms are commercially available from Aerospace International Materials, Inc.

Suitable brazing materials for fabricating the preforms are alloys made of two or more pure metals. The physical properties of a brazing material are based on metallurgical composition. This composition determines whether the brazing material is compatible with the metals being repaired—capable of wetting them and flowing completely through the joint area and/or cracks without forming detrimental metallurgical compounds. Melting behavior is also based on metallurgical composition. Since most brazing materials are alloys, they usually do not melt the same as pure metals that change from a solid to a liquid state at one temperature, the exception being those metal alloy compositions that form eutectics upon melting. In metallurgical terms, a eutectic brazing material has an identical melting point (solidus) and flow point (liquidus).

The brazing material preform is then spot welded to the surface to permit further handling of the turbine component to effect repair of the damaged portion. Resistance welding, or the like, can be employed for spot welding the brazing material preform to the surface. Preferably, the amount of spot welding is kept to a minimum so as to prevent distortion damage to the turbine component.

The turbine component including the spot welded preform are then exposed to a brazing process to form a braze joint in the damaged portion. In a preferred embodiment, the brazing process takes place in a furnace. Preferably, the furnace is equipped with vacuum and gas capabilities. Vacuum brazing is preferably carried out between about $10^{-3}$ and about $10^{-6}$ millibar pressure and temperatures greater than 600° F., which further helps to prevent oxidation of the metal components. More preferably, the pressure is at about $10^{-4}$ millibars. Under these conditions, the use of flux is generally not employed.

The temperature during the brazing process is preferably stepwise increased for a predetermined periods of time and subsequently stepwise cooled to form the braze joint. It is noted that unlike welding, brazing doesn't melt the base or parent metals of the turbine component. So brazing temperatures are invariably lower than the melting points of the base metals. However, the brazing material, i.e., alloy composition, is chosen to melt at a lower temperature than the base material of the turbine component. Preferably, the brazing material has a melting point less than about 25° C., with less than about 50° C. more preferred, with less than about 100° C. even more preferred, and with less than about 200° C. most preferred. The brazing material, upon melting, preferably wets the surface of the base material and fills any voids and interstices in the damaged portion as well as flows into the interface formed between the preform and the turbine component. Upon further processing and cooling, a braze joint is formed between the braze material and the base metal of the turbine component.

Following completion of the brazing process, the surfaces are preferably machined to their proper profile. Preferably, the surfaces are machined to the original dimensions as specified for the turbine component. Although optional, machining may be needed where a step height difference in the surface would be considered a defect to the turbine component. Preferably, the machining process does not unduly raise the temperature of the turbine component.

Figure 2:
FIG. 2 pictorially illustrates substrates after brazing, after grinding, and a witness substrate.
Figure 2:
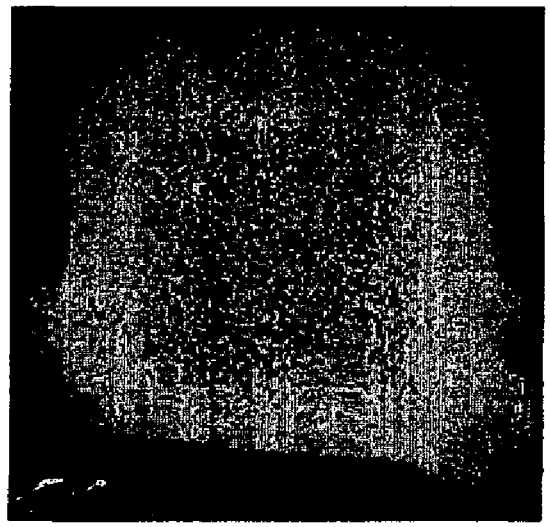
Figure 2:
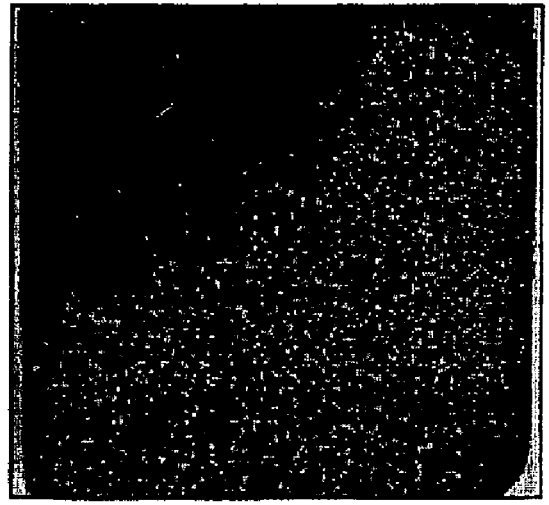

In an alternative embodiment, the damaged portion is removed from the turbine component to form a recess in the turbine component. Preferably, only the damaged portion is removed. Removal of the damaged portion can be effected using a number of different methods, For example, upon metallurgical analysis and determination that a portion of the turbine component is damaged, a milling processes may be employed to remove the damaged portion from the turbine component. One or more preforms of the brazing material are then cut to the lateral dimensions of the removed portion and spot welded into the recess. The seams formed between the spot welded preform and the turbine component can optionally be covered with a fluxing agent. A brazing cycle is then commenced to form a braze joint between the brazing material and the turbine component, e.g., the turbine component is exposed to a heating process such as the one shown in FIG. 2.

Optionally, the turbine component is first subjected to a cleaning process. The cleaning process can take many forms or combinations depending on the type of brazing process employed, e.g., alkaline cleaning, acid cleaning, gas cleaning, degreasers, combinations comprising at least one of the foregoing cleaning processes, or the like. The choice of cleaning process employed will depend on the part to be repaired and the type of brazing process desired to form the brazed joint. The cleaning process may also include light grit blasting to further remove smut or the like resulting from the cleaning process. Preferably, the cleaning process is done at an elevated temperature to facilitate an increase the chemical reactions associated with the respective cleaning process.

Also optional, a protective gas may be used prior to the brazing process to prevent the formation of metal oxides. For example, in high temperature vacuum furnace brazing it is preferred that an inert gas be used to help reduce the formation of metal oxides on the exposed surfaces. The inert gas does not have to have a reducing effect, it merely suffices that it hinders the formation of metal oxides. However, instead of an inert gas, it may be preferred to use a gas that is chosen to be reducing, e.g., $H_2$. If reducing gases are used, any metal oxides that are present are removed via a chemical reaction with the reducing components of the inert gas. The extent of the reaction generally depends on the bond enthalpy of the metal oxide and on the dryness of the inert gas.

The following examples are provided to illustrate some embodiments of the present disclosure. They are not intended to limit the disclosure in any aspect.

EXAMPLE 1

Figure 3:
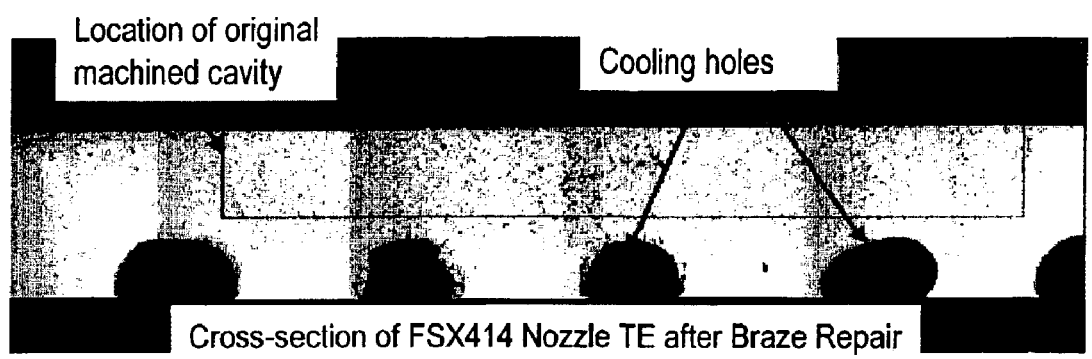
FIG. 3 pictorially illustrates a braze repair of a nozzle component.

In this example, presintered preforms of a brazing material and a metal alloy substrate were used to simulate a repair of a turbine component. A 1-inch by 1-inch cavity was milled into an alloy substrate, commercially available under the tradename FSX414 from Howmet Castings. The presintered preform was a commercially available brazing alloy under the tradename X40/D15 from the Aerospace International Materials, Inc. The brazing alloy was obtained as a preform having the following dimensions: 4 inch by 4 inch by 60 mils. FIG. 1 illustrates the process flow for brazing the preform to the FSX414 substrate. Prior to processing, the FSX414 substrate was exposed to hydrogen gas at 2100° F. for about 2 hours. In addition, a paste was applied to the seams formed between the spot welded preform and the substrate. The substrate and preform were then stepwise heated from about room temperature to about 2100° F. and cooled back to room temperature. The applied braze filler metal past, obtained from Praxair, Inc., comprised a brazing alloy composition disposed in a binder with a 90:10 metal to binder ratio. At or about brazing temperatures, the binder burns off leaving the brazing alloys to melt and further seal the seams between the brazing preform and the substrate. Upon cooling, the repaired substrate was inspected. FIG. 3 depicts micrographs showing the substrate after the brazing process and after grinding to restore the substrate to its original dimension. The substrate was exposed to 500 cycles in an 1800° F. furnace after grinding. A witness substrate is provided for comparison.

EXAMPLE 2

In this example, a section of a nozzle was removed and subjected to the brazing process as in Example 1. After brazing, the surface was machined to its original dimensions. FIG. 3 illustrates a plan view of the nozzle section, with the location of the replaced section identified. The micrographs clearly show that the openings are substantially unaffected by the brazing process.

EXAMPLE 3

Figure 4:
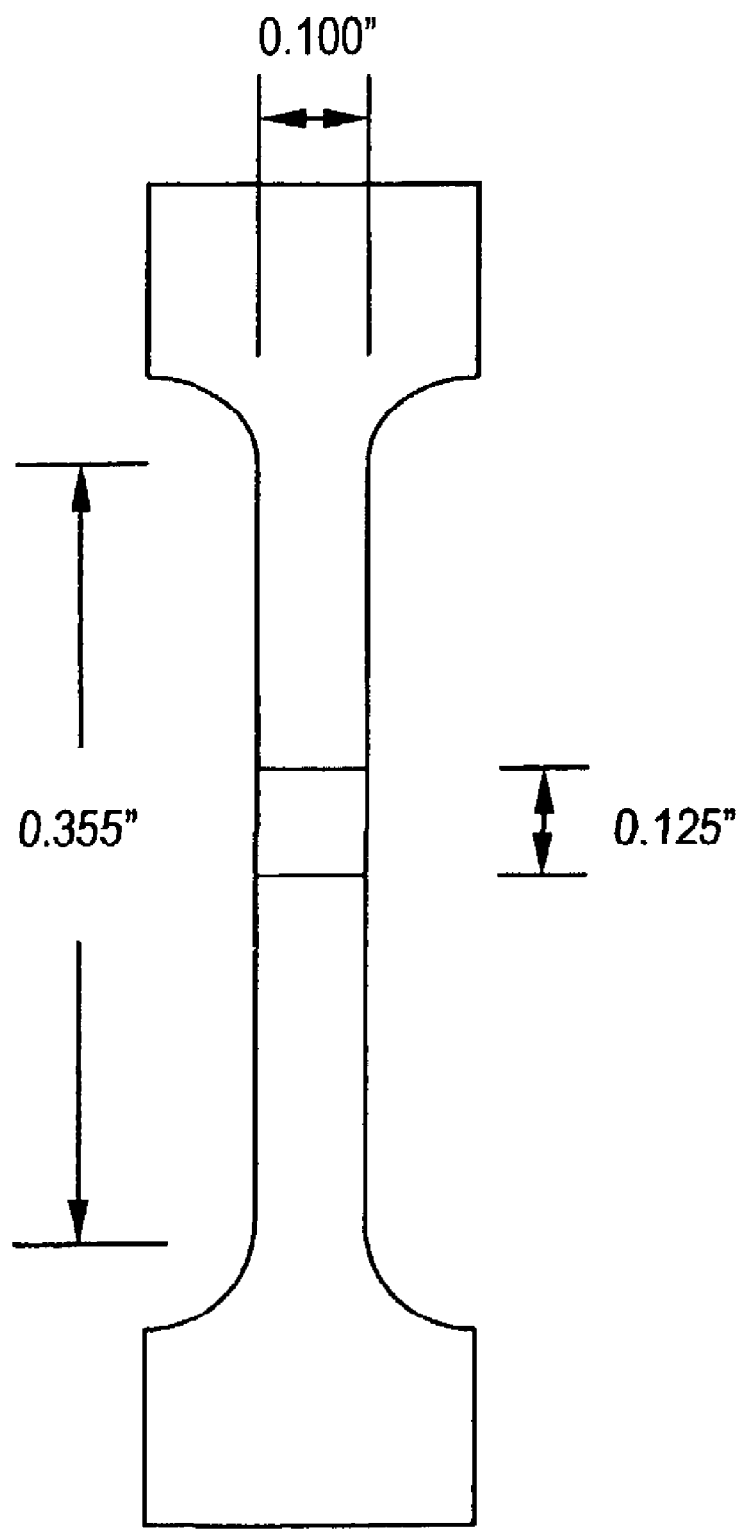
FIG. 4 is a plan view of a test structure for measuring tensile strength of various brazed joints.

In this example, tensile strength was measured at room temperature and at 1,500° F. The test structure dimensions are shown in FIG. 4. FSX414 alloy was employed as the base metal. The brazing alloy was the X40/D15 alloy. The brazed joint was formed as defined by the brazing process of Example 1. A comparison of the test structure with and without the brazed joint (the parent component by itself and configured in the shape as dimensioned for the test structure) was made. Tensile strength measurements were made on an Instron Model No. 1125 screw driven frame at 0.02 inches per minute. The results are shown in Table 1, which clearly show that tensile strength, yield stress, and percent elongation for the brazed material was about same or stronger than the parent material by itself. The results demonstrate that brazed joint provided structural soundness to the structure equivalent or better than the parent structure.

TABLE 1

| Material | Temperature (° F.) | 0.2% Yield Stress (ksi) | Ultimate Tensile Strength (ksi) | Elongation to Failure (%) |
|---|---|---|---|---|
| FSX414 | RT | 61.3 | 90 | — |
| FSX414 | RT | 58.9 | 87.8 | 15 |
| FSX414 | 1,500 | 28 | 50.6 | 29 |
| FSX414 | 1,500 | 27.7 | 49.6 | 31 |
| FSX414 | 1,500 | 27.8 | 52.2 | 28 |
| Brazed | RT | 66.4 | 79.3 | 1 |
| Brazed | RT | 66.3 | 74.5 | 1 |
| Brazed | RT | 69.5 | 77.4 | 1 |
| Brazed | 1,500 | 33.5 | 55.1 | 13 |
| Brazed | 1,500 | 30.3 | 54.7 | 10 |
| Brazed | 1,500 | 30.4 | 49.9 | 13 |

Advantageously, the process described herein is extremely versatile and can be used to repair variable sections of the turbine component since the preform can be easily fitted to any size or shape. For example, local repair of damaged portions can be made near cooling holes without disturbing the integrity of the holes such as in the case of nozzle repair. In general, the brazing process offers a less aggressive repair process than prior manual wishbone replacement techniques. The brazing process provides uniform exposure of heat to the repaired turbine component minimizing the formation of secondary cracks associated with prior art welding processes. Moreover, since the brazing process applies uniform heat exposure to the entire part, damage to areas surrounding the replacement region is prevented. The brazing preforms can be readily manufactured into any size or shape. The brazing process can be used to provide the original dimensions and is effective for restoring airfoil leading and trailing edges on any gas turbine vane.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A process for repairing a turbine component, comprising:
   removing a damaged portion from a surface of the turbine component to form a recessed portion in the surface;
   overlaying a preform consisting of brazing material onto the recessed portion;
   securing the preform; and
   heating the turbine component to a temperature effective to form a brazed joint between the brazing material and the turbine component, wherein heating the turbine component comprises stepwise heating to a temperature greater than a melting temperature of the brazing material and less than a melting temperature of the turbine component.

2. A process for repairing a turbine component, comprising:
   removing a damaged portion from a surface of the turbine component to form a recessed portion in the surface;
   overlaying a preform consisting of brazing material onto the recessed portion;
   securing the preform to the surface, wherein securing the preform to the surface comprises spot welding; and
   heating the turbine component to a temperature effective to form a brazed joint between the brazing material and the turbine component.

3. The process according to claim 2, further comprising machining the turbine component to return the turbine component to its original dimensions.

4. The process according to claim 2, further comprising protecting the turbine component with an inert gas prior to spot welding the preform to the surface of the turbine component.

5. The process according to claim 2, further comprising protecting the turbine component with a reducing gas prior to spot welding the preform to the surface of the turbine component.

6. The process according to claim 4, wherein the reducing gas is hydrogen gas.

7. The process according to claim 2, wherein the brazing material consists of at least one of an alloy or a superalloy of two or more metals.

8. The process according to claim 2, wherein heating the turbine component comprises heating in a vacuum and an inert atmosphere.

9. A process for repairing a turbine component, comprising:
   removing a damaged portion from a surface of the turbine component to form a recessed portion in the surface;
   spot welding at least one preform consisting of a brazing material to the recessed portion, wherein the preform has lateral dimensions about equal to lateral dimensions of the recessed portion; and
   heating the turbine component to a temperature sufficient to form a brazed joint between the brazing material and the turbine component.

10. The process according to claim 9, further comprising machining the turbine component to return the turbine component to its original dimensions.

11. The process according to claim 9, further comprising protecting the turbine component with an inert gas prior to spot welding the preform.

12. The process according to claim 9, further comprising protecting the turbine component with a reducing gas prior to spot welding the preform.

13. The process according to claim 12, wherein the reducing gas is hydrogen gas.

14. The process according to claim 9, wherein heating the turbine component comprises stepwise heating to a temperature greater than a melting temperature of the brazing material and less than a melting temperature of the turbine component.

15. The process according to claim 9, wherein the brazing material comprises an alloy of two or more metals.

16. The process according to claim 9, wherein heating the turbine component comprises a vacuum and an inert atmosphere.

* * * * *